United States Patent [19]

Malifaud

[11] Patent Number: 4,991,072
[45] Date of Patent: Feb. 5, 1991

[54] RADIATION PROJECTOR FOR PRODUCING A HOMOGENEOUS FLUX

[76] Inventor: Pierre Malifaud, 95 Boulevard Jourdan, 75014 - Paris, France

[21] Appl. No.: 423,546

[22] Filed: Oct. 13, 1989

Related U.S. Application Data

[63] Continuation of Ser. No. 222,380, Jul. 20, 1988, abandoned, which is a continuation of Ser. No. 120,220, Nov. 12, 1987, abandoned, which is a continuation of Ser. No. 840,852, Mar. 18, 1986, abandoned.

[30] Foreign Application Priority Data

Mar. 19, 1985 [FR] France ................................ 85 04047

[51] Int. Cl.⁵ ............................................... F21V 7/00
[52] U.S. Cl. .................................... 362/297; 362/301; 362/347
[58] Field of Search ............... 362/217, 296, 297, 298, 362/301, 346, 347, 350, 341, 349

[56] References Cited

U.S. PATENT DOCUMENTS

| | | | |
|---|---|---|---|
| 3,535,016 | 10/1970 | Malifaud | 350/96.24 |
| 3,676,667 | 7/1972 | Malifaud | 262/301 |
| 3,995,153 | 11/1976 | Malifaud | 362/297 |

FOREIGN PATENT DOCUMENTS 2252583 11/1973 France .
2224771 10/1974 France .

Primary Examiner—Noah P. Kamen
Attorney, Agent, or Firm—Cushman, Darby & Cushman

[57] ABSTRACT

An optical radiation projector includes a reflector having at least two facing reflective surfaces, dimensioned and positioned with respect to each other and a radiation source to satisfy a selected set of dimensional relationships and which further comprises one fraction of a rear reflective part having at least one meridian section of circular arc shape centered axially forward of the radiation source so that the reflected radiation has a point of convergence situated forward of the outermost part of the source and for which the reflected radiation will have a substantially homogeneous distribution on a plane of utilization.

2 Claims, 5 Drawing Sheets

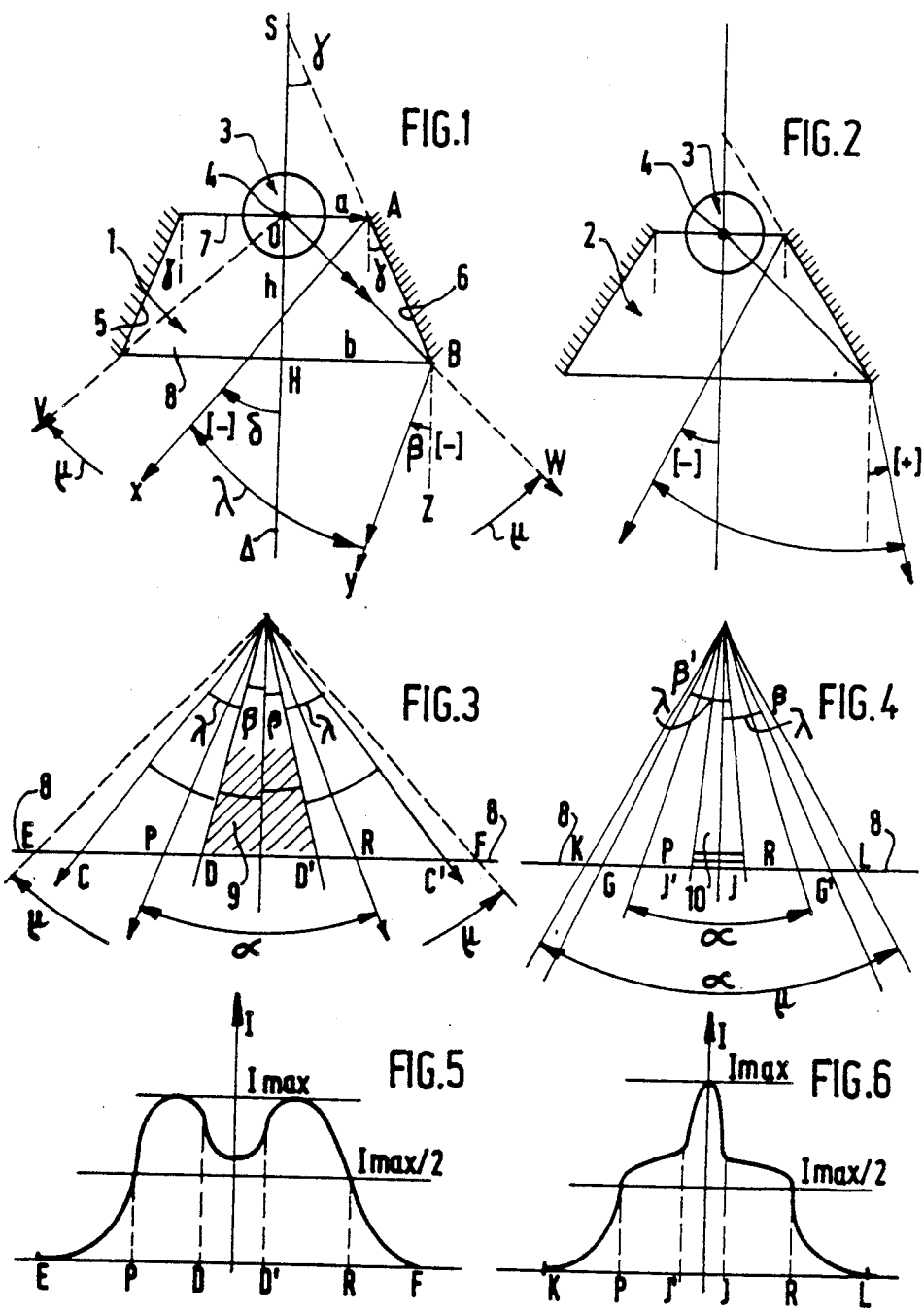

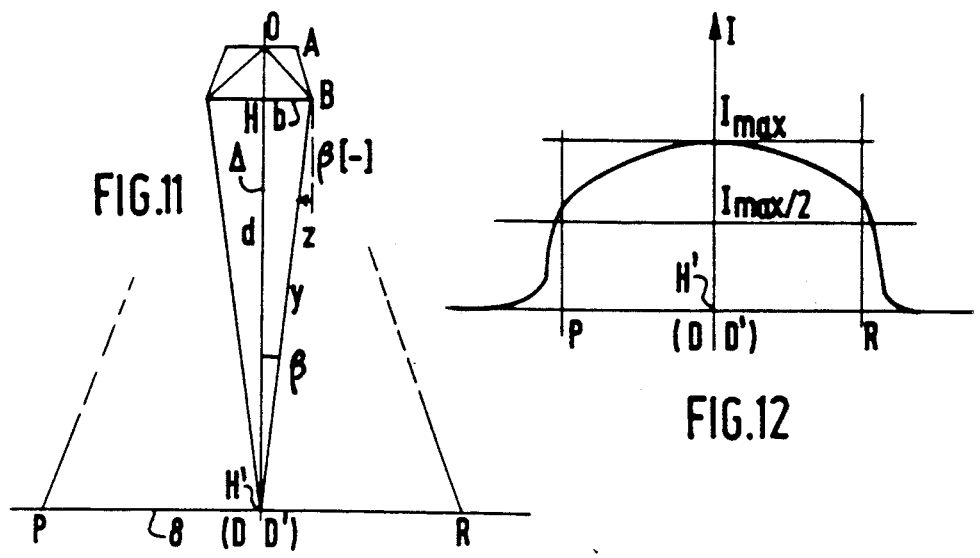
FIG.11
FIG.12
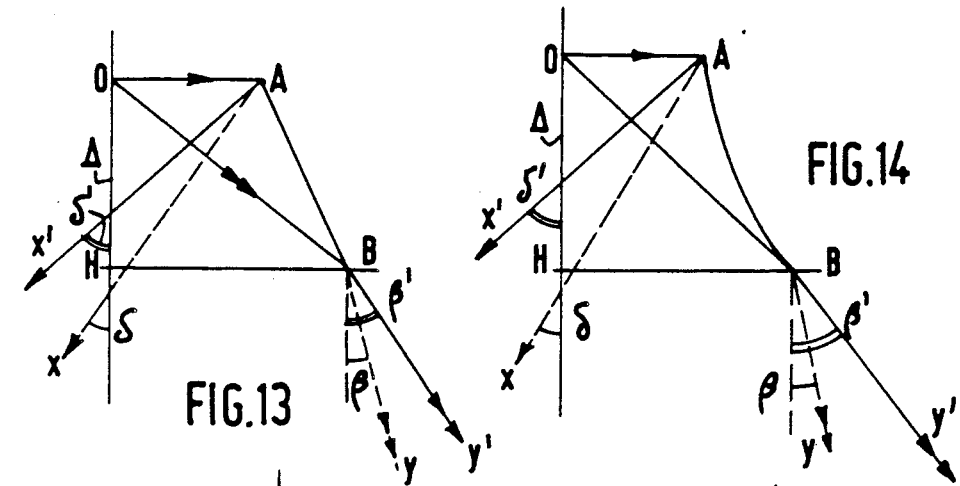
FIG.13
FIG.14
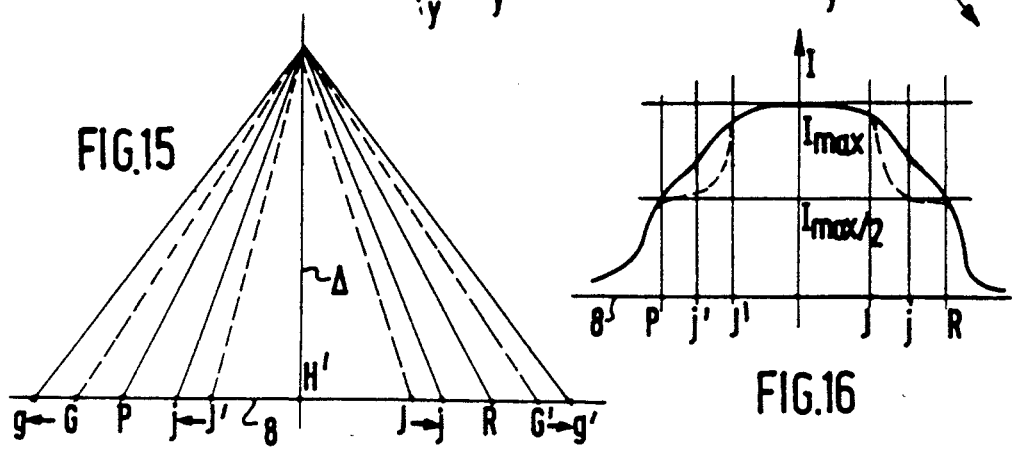
FIG.15
FIG.16

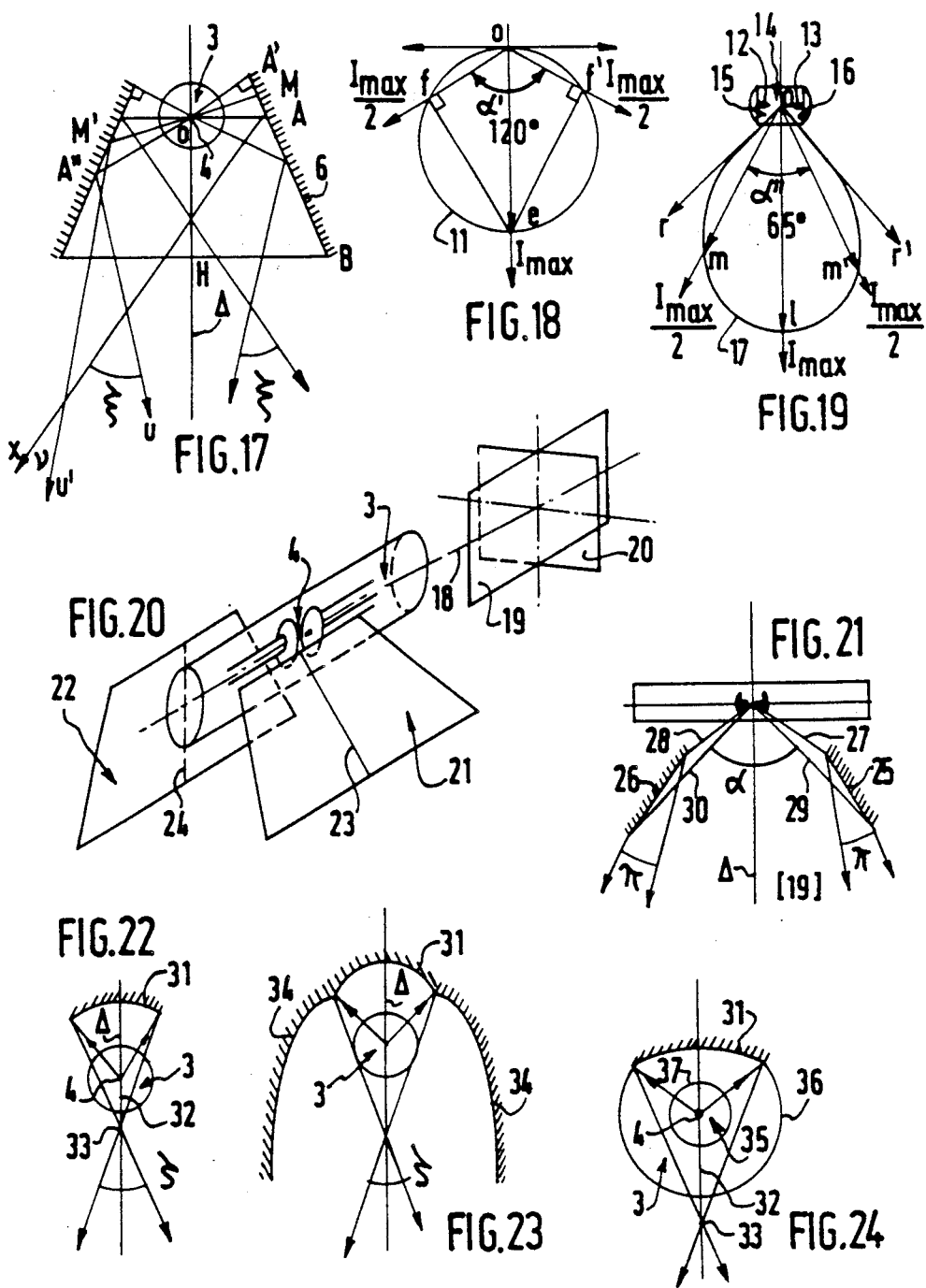

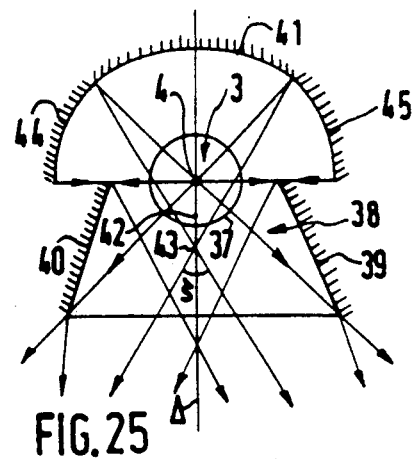
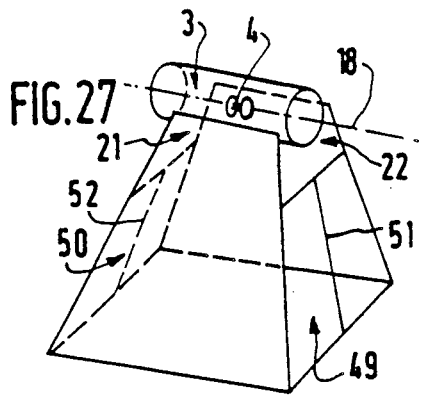
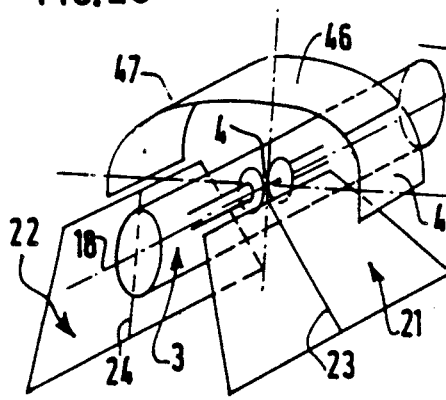
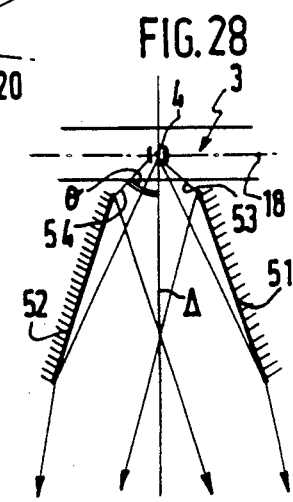
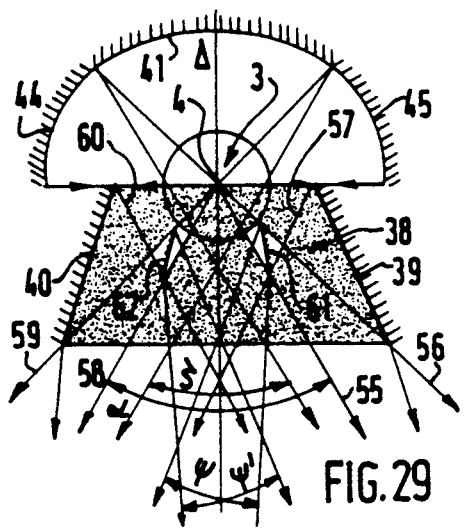
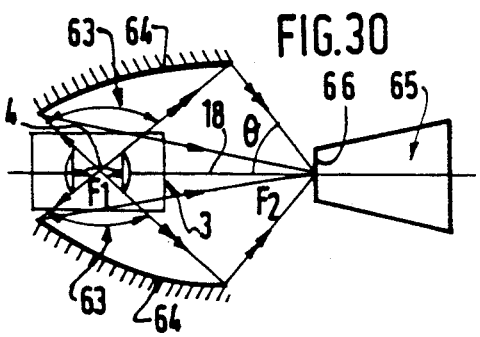

RADIATION PROJECTOR FOR PRODUCING A HOMOGENEOUS FLUX

This is a continuation of application No. 07/222,380, filed July 20, 1988, now abandoned, which is a continuation of Ser. No. 07/120,220, filed Nov. 12, 1987, abandoned, which is in turn a continuation of 06/840,852, filed Mar. 18, 1986, abandoned.

BACKGROUND OF THE INVENTION

1. Field of the Invention

Traditional radiation reflectors usually employ reflective surfaces similar to parabolic, elliptical, cylindrical-parabolic or cylindrical-elliptical mirrors. As a result of this the radiation flux is projected with a distribution which is often highly inhomogeneous and with imprecise aperture angles, entailing significant losses of efficiency and also causing glare beyond the required apertures.

The lack of homogeneity is partially remedied by making the surface of these mirrors irregular or diffusive, which further reduces the efficiency and further randomises the aperture angles. In the case of point or quasi-point sources like xenon arc lamps and metal halogenide lamps, the lack of homogeneity becomes so serious that it is no longer possible to render it acceptable with acceptable conditions of efficiency and aperture angle control.

2. Description of Related Art

The applicant has also proposed, notably in patent Nos. FR-A-1.602.203, FR-A-2.224.769 and FR-A-2.224.770, to use optimised conoid or pyramidal mirrors which make it possible to obtain with traditional sources of radiation projected fluxes featuring good homogeneity and high efficiency within relatively precise aperture angles.

The terms conoid and pyramidal mirror designate a mirror having the shape of the lateral surface of a geometrical solid delimited by two bases, permeable to the radiation, parallel to each other and of unequal area, the cross-section parallel to the bases of this solid increasing progressively from the smaller base, which acts as the flux input section, to the larger base, which acts as the flux output section, the two bases being linked by reflective lateral surfaces, contiguous or otherwise, and the geometric solid having at least two planes of symmetry perpendicular to the bases. The intersection of these planes of symmetry constitutes the mean optical axis of the conoid or pyramidal mirror. The simplest conoid is the cone, but all manner of varieties may be employed to adapt the reflector to the geometry of the source and to that required of the beam. Specifically, the term pyramidal mirror means a mirror of this kind in which the bases are substantially polygonal and the reflective lateral surfaces, contiguous or otherwise, are plane or slightly curved or cambered.

The source of radiation and/or images of this source are disposed in the smaller section of the conoid or pyramidal mirror. An associated collector mirror is used to recover radiation emitted towards the rear of the conoid or pyramidal mirror.

When the source of radiation is a point or quasi-point source, shortcomings in respect of homogeneity can no longer be suitably reduced by these conoid or pyramidal mirrors of currently known design. Appropriate correction requires that the source of radiation and/or its images occupy a significant fraction of the small section of the conoid or pyramidal mirror, so that the flux emanating from this input section has a distribution that is as close to the Lambert distribution as possible. This is no longer the case when the source is a point or quasi-point source. It results in areas of increased and reduced brightness on the planes onto which the flux is projected, with considerable nuisance, value.

SUMMARY OF THE INVENTION

The present invention makes it possible to reduce considerably these defects to the point of rendering them virtually undetectable and offers improved control over the aperture angles, increases the efficiency, permits considerable miniaturisation of the radiation projector and, in certain cases, simplifies the technological implementation.

To this end, an object of the invention is an optical radiation projector device comprising a source of radiation and adapted to produce on a given mean plane of utilisation a flux having a so-called aperture angle of predetermined value in which the intensity of the projected radiation varies between its maximum value and a value in the order of one half of the latter, of the type comprising a reflector having, relative to the associated source, a front part towards the plane of utilisation and a rear part, characterised in that to make the radiation as homogeneous as possible within said aperture angle, the reflector:

comprises a front part consisting of a conoid or pyramidal type mirror having at least two facing reflective surfaces, with dimensions and positions in space adapted to satisfy substantially the following dimensional relationships:

$$(b-a)/h = tg\gamma$$

$$h/b = cotg(2\gamma - \beta)$$

where $\gamma$ is the mean half-angle of said profiles of the facing reflective surfaces of the conoid or pyramidal mirror, the value of which is in the order of 0.48 times that of the so-called aperture angle of the device, a is, in the smaller section of the conoid or pyramidal mirror, the distance to the mean axis of this mirror from each of the profiles of the facing reflective surfaces, the value of which is predetermined (and preferably minimalised) relative to the outside dimensions of said source of radiation disposed approximately in this small section, b is, in the larger section of the conoid or pyramidal mirror, the distance to said mean axis of each of the profiles of said reflective surfaces, h is the distance, on said mean axis, between the smaller section and the larger section of the conoid or pyramidal mirror, $\beta$ is the trigonometrical, that is anticlockwise oriented angle defined by a line parallel to said mean axis originating at a point situated at the edge of one of the profiles of said reflective surfaces in the larger section of the conoid or pyramidal mirror and the ray from the source of radiation, after reflection at this point on said reflective surface, the value of this angle being predetermined and having either a positive sign, in which case this value is set as near as possible to half that of the so-called aperture angle of the device, allowing for the limitations imposed by the aforementioned dimensional relationships and by the maximum permissible values usable in practice for the aforementioned distances b and h, or a negative sign in which case this value is determined by the equation:

$tg\beta = b/d$ in which d is the distance of the larger section of said conoid or pyramidal mirror from said mean plane of utilisation, and/or comprises at least a fraction of its rear part reflective and featuring at least one meridian section of circular arc shape centered axially forward of the source so that the reflected radiation features a point of convergence situated forward of the outermost part of the source and from which this reflected radiation extends according to a substantially homogeneous distribution in an angle such that the total flux finally obtained is distributed in the so-called aperture angle of the device having the required value.

According to other features of the invention:

the value of the mean half-angle of the profiles of the facing reflective surfaces in the case where the oriented angle has a positive value is related to the value of the so-called aperture angle of the device by the equation:

$\gamma \approx 0.52 \, \alpha$ the facing reflective surfaces feature at least in the vicinity of at least one of the edges of the smaller section and of the larger section of the conoid or pyramidal mirror curved parts the convex side of which is directed towards the mean axis of said mirror;

the totality of at least one half of the facing reflective surfaces has a convex side directed towards the mean axis of the conoid or pyramidal mirror;

the reflective surfaces of the conoid or pyramidal mirror are extended rearwardly, short of the plane of the source perpendicular to the mean axis, such extension possibly extending to the point on the reflective surface where the rays emitted by the source reach the profile of said surface with zero angle of incidence;

the source of radiation being of the type having in a meridian section a non-Lambertian distribution of intensities and having a total emission angle less than 180 degrees in which the intensity varies from its maximum value to a nil value, and a so-called aperture angle in which the intensity varies from its maximum value to a value equal to one half thereof, the distribution of the intensities remaining substantially Lambertian in the meridian section perpendicular to that mentioned hereinabove, the so-called aperture angle of the device and this so-called aperture angle specific to the source are adapted appropriately, the conoid or pyramidal mirror comprising only two facing reflective surfaces the geometrical characteristics of the profiles of which are defined in the section of the mirror by a plane of symmetry perpendicular to the meridian section in which the distribution of the intensities is not Lambertian;

the device comprises two facing reflective surfaces perpendicular to the meridian section in which the distribution of the intensities is not Lambertian and adapted to capture the parts of the flux which are emitted towards the front by the source of radiation and which are comprised between the extreme rays of the total flux and the rays corresponding to the so-called aperture angle specific to the source, these two surfaces reflecting said parts of the flux towards the mean plane of utilisation within an angle whose value is in the order of the so-called aperture angle of the device;

the fraction of the reflective rear part of circular arc shape is incorporated into the source of radiation;

the device being of the type comprising both the front and rear arrangements, the rear part comprises two reflective surfaces adjoining the fraction, contiguous therewith or not, disposed angularly one on each side and having meridian sections of circular arc shape centred on the source of radiation;

the two adjoining reflective surfaces are deprived of all that part in which they no longer receive any radiation from the source by virtue of the extension towards the rear of the reflective surfaces of the conoid or pyramidal mirror;

the device being of the type comprising both the front and rear arrangements, the rear part comprises two reflective surfaces adjoining the fraction, disposed angularly one on each side, which reflect the radiation from the source towards the plane of utilisation through the smaller section of the conoid or pyramidal mirror or outside this small section or both through and outside this small section;

within the conoid or pyramidal mirror, in the areas in which there are no rays emitted by the source of radiation in the so-called aperture angle of this mirror, nor any rays reflected by the facing reflective surfaces, nor any rays reflected by the reflective rear part or parts, and outside the space occupied by said source, are disposed mirrors which capture flux emitted towards the front by the source of radiation in directions at angles to the mean axis of the reflector between half the so-called aperture angle of the device and the maximum angle of the rays tangential to the edge of the larger section of said conoid or pyramidal mirror, and which reflect them towards areas on the plane of utilisation of reduced brightness;

the source of radiation being of the type using a flux with non-Lambertian distribution in a meridian section and having a total emission angle less than 180 degrees, the conoid or pyramidal mirror is associated with an elliptical mirror which is a body of revolution about the axis of symmetry of this flux, with one focus coinciding with the source and the other focus disposed substantially at the centre of the smaller section of the conoid or pyramidal mirror;

the facing reflective surfaces of the conoid or pyramidal mirror are mobile in translation perpendicularly to the mean axis of the device, so as to vary their separation while maintaining the value of the half-angle at the mean summit of the conoid or pyramidal mirror.

BRIEF DESCRIPTION OF THE DRAWINGS

The invention will be better understood from the following detailed description given with reference to the accompanying drawings. It is to be understood that the description and the drawings are given by way of non-limiting example only.

FIGS. 1 and 2 show a meridian cross-section of the conoid or pyramidal mirror in two different optical cases.

FIGS. 3 and 4 show the distribution of the radiation flux reaching the mean plane of utilisation in these two cases.

FIGS. 5 and 6 show the distribution of luminance on a mean plane of utilisation in these two cases.

FIGS. 11 and 12 show the distribution of the beams and the luminance diagrams corresponding to a second dimensional arrangement.

FIGS. 13 and 14 show curved reflective surface profiles and their optical effects.

FIGS. 15 and 16 show the distribution of the beams and the luminance diagrams obtained with the curved profiles of FIGS. 13 and 14.

FIG. 17 shows one embodiment in which the reflective surfaces of the conoid or pyramidal mirror are extended towards the rear.

FIGS. 18 and 19 are polar diagrams of the respective intensity distributions for a Lambertian source and a non-Lambertian source.

FIG. 20 shows an embodiment in which the device is reduced to two sides of a pyramidoid.

FIG. 21 shows an improvement consisting in the addition of supplementary mirrors in the section where the emission of radiation is not Lambertian.

FIG. 22 shows a fraction of circular profile rear reflective surface.

FIG. 23 shows the association between this fraction and any reflector.

FIG. 24 shows the incorporation of this fraction into the source of radiation itself.

FIG. 25 shows a device comprising both a conoid or pyramidal mirror and three rear mirrors.

FIG. 26 shows an example of this device in perspective in the case of a so-called aperture half-angle of 60 degrees.

FIG. 27 shows an example of this device in perspective in the case of a so-called aperture half-angle of 40 degrees.

FIG. 28 shows, in this latter example, the meridian section of the conoid or pyramidal mirror in the plane in which the emission is not Lambertian.

FIG. 29 shows the addition in a meridian section of a second conoid or pyramidal mirror within one as already described.

FIG. 30 shows an embodiment in which the flux produced is directed in the direction of the longitudinal axis of the source of radiation.

DESCRIPTION OF THE PREFERRED EMBODIMENTS

Figure 7:
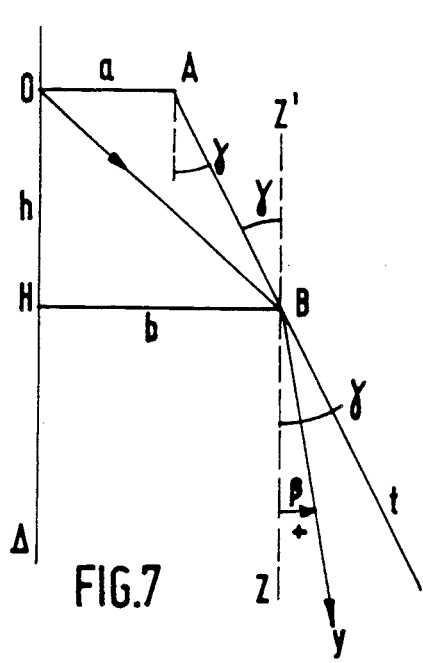
FIGS. 7 and 8 are geometrical diagrams showing the dimensional relationships in accordance with the invention of the conoid or pyramidal mirrors in these two cases.

In FIGS. 1 and 2 there are schematically represented meridian sections of conoid or pyramidal mirrors of known types, respectively designated 1 and 2, associated with a source of radiation 3 of which the emitting body 4 is here of the point or quasi-point type, in two different optical situations.

In the case of FIG. 1 the conoid or pyramidal mirror 1 has facing reflective surfaces 5 and 6. The profile of these surfaces 5 and 6, which is a generatrix of the conoid or pyramidal mirror 1, is inclined relative to the axis of symmetry $\Delta$ by an angle $\gamma$ which is the mean half-angle at the summit S of the conoid or pyramidal mirror 1 in this meridian section. The emitting body 4 of the source of radiation 3 is here disposed at the center O of the smaller section 7 of the mirror 1. This conoid or pyramidal mirror 1 is dimensioned in this meridian section by the distance OA=a from the center O to the edge A of the smaller section 7, by the distance HB=b from the centre H of the larger section 8 to its edge b, and by the height OH=h on the axis $\Delta$ of the conoid or pyramidal mirror 1. The magnitudes of all these dimensions $\gamma$, a, b, h are determined in the manner known from the applicant's prior patents, notably the patent Nos. FR-A-2.224.769 and FR-A-2.224.770.

A mirror 1 of this kind receives the flux emitted by the emissive body 4 of the source 3 between the directions OA and OB, with regard to the generatrix 6 of the mirror, for example, and reflects this flux in the directions Ax and By the angle between which is $\gamma$. The same applies symmetrically relative to the axis $\Delta$ insofar as the flux that the generatrix 5 receives and reflects is concerned.

The ray By reflected from the edge of the larger section of the conoid or pyramidal mirror 1 is inclined to the direction Bz parallel to the axis $\Delta$ by an angle $\beta$. The ray Ax reflected from the edge of the smaller section is at an angle $\delta$ to the direction of the axis $\Delta$. If the angles $\beta$ and $\delta$ are considered as oriented relative to the direction of the axis $\Delta$, they are both, in the case shown in FIG. 1, assigned a negative sign (—) in the trigonometrical, that is anticlockwise, direction.

The conoid or pyramidal mirror 2 shown in FIG. 2 has characteristics that may be defined by the same general description as that which has just been given in relation to FIG. 1, but differs insofar as the angles $\beta$ and $\delta$ are concerned. The angle $\delta$ is again assigned the sign (—) but the angle $\beta$ is this time assigned the sign (+).

The two cases correspond to greatly differing distributions of radiation intensity on superposition of the flux as reflected by the conoid or pyramidal mirrors 1 or 2 and the flux emitted directly, without reflection, by the emissive body 4, this flux being contained between the extreme directions OV and OW (see FIGS. 1 and 2) the angle between which is $\mu$. FIG. 3 shows the paths of the extreme rays delimiting these various fluxes in the case of the mirror of FIG. 1. FIG. 4 shows these paths in the case of the mirror of FIG. 2. The so-called aperture angle $\alpha$ of the device comprising the conoid or pyramidal mirror in association with the source of radiation, an angle in which the intensity of the radiation varies from its maximum value to a value equal to half this, is also shown. The angle $\alpha$ is here assumed to have the same value in both cases under consideration.

The flux of radiation is received on a mean plane of utilisation 8 (FIGS. 3 and 4).

In FIG. 3 the flux reflected between the extreme directions Ax and By, between which the angle is $\lambda$, in the meridian section of the figure, reaches the mean plane of utilisation 8 between the points C and D and the symmetrical reflected flux between the points C' and D'. The direct flux emitted by the source between the extreme directions Ov and Ow, the angle between which is $\mu$, reaches the plane 8 between the points E and F. The so-called aperture angle $\alpha$ corresponds to limiting directions reaching the plane 8 at points P and R. The area between points D and D' does not receive any ray reflected by the conoid or pyramidal mirror 1. It receives only the rays emitted directly towards it by the emissive body 4 of the source 3. There results between D and D' an area 9 of reduced brightness; the more nearly the emissive body 4 is a point source, and consequently the more clearly delimited the beams, the more serious this effect.

In the other case shown in FIG. 4, corresponding to that of FIG. 2, in which the angle $\beta$ is assigned a positive sign (+), the flux reflected between the extreme directions Ax and By reaches the mean plane of utilisation 8 between the points G and J and the symmetrical flux between the points G' and J'. The direct flux emitted by the source between the extreme directions Ov and Ow reaches the plane 8 between the points K and L. The area between points J' and J receives the superposed symmetrical reflected fluxes in addition to the flux directly emitted by the source 3. This results in an area 10 of increased brightness between J and J', the more serious the more nearly the emissive body 4 is a point source. It so happens that in the case where the known dimensional relationships assign a positive sign value to $\beta$, this value is generally very small, in the order of a few degrees, producing a narrow and therefore particularly flagrant and bothersome area of increased brightness.

FIGS. 5 and 6 show typical distributions of luminance over a white surface disposed in the mean plane of utilisation 8 in the respective cases of FIGS. 1 and 3, on the one hand, and FIGS. 2 and 4, on the other hand. Luminance is the parameter that governs directly visual perception of luminous contrast. It varies proportionally to the intensity of radiation. In FIGS. 5 and 6 there are plotted along the horizontal axis the limits of the illuminated areas on the plane of utilisation 8, as defined in FIGS. 3 and 4, and along the vertical axis the corresponding luminance intensities. The maximum intensity is designated Imax. The intensity corresponding to the limits of the so-called aperture angle $\alpha$ is designated Imax/2. In the case of FIG. 5, there is seen a reduction in luminance between points D and D'. In the case of FIG. 6 there is seen a spike of increased luminance between points J' and J.

It is to be understand that an analogous description could be given in the meridian plane passing through the axis $\Delta$ and perpendicular to the meridian plane to which the description so far applies.

This being so, a particular object of the invention is a new way of optimising the dimensions of such conoid or pyramidal mirrors eliminating the shortcomings as to homogeneity which have just been described, or at least reducing them to the point where they cease to be bothersome for visual observation.

This new method of optimisation takes account of the angle $\beta$ which is the most important factor, as has just been seen, in the formation of areas of reduced or increased brightness. The value of this angle $\beta$ is predetermined in accordance with the invention to secure the required result.

Figure 8:
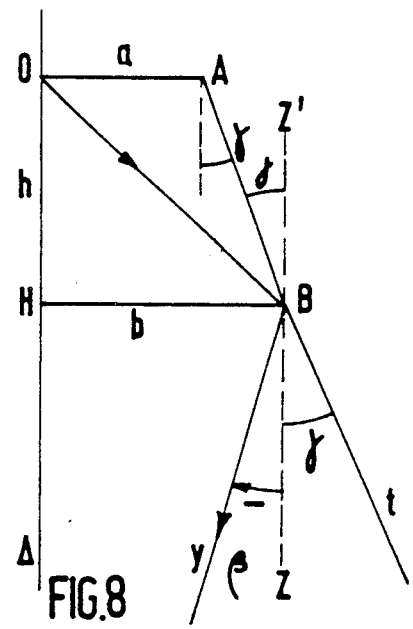

How the angle $\beta$ is taken into account will now be described with reference to FIGS. 7 and 8.

In the situation as described with reference to FIGS. 2, 4 and 6 in which the oriented angle $\beta$ has a positive sign, it is possible to establish a dimensional equation relating the parameters $\gamma$, a, b and h as defined hereinabove and the angle $\beta$ (see FIG. 7):

In the right-angle triangle OHB, we have:

$$h/b = tg\ \widehat{OBH}$$

Also, designating by BZ' the extension of BZ (parallel to the axis $\Delta$ starting from B) and Bt the extension of the profile AB of the reflective surface of the conoid or pyramidal mirror, we have:

$$\widehat{OBA} = \widehat{yBt}\ \text{(reflection of ray OB at surface At)}$$

$$\widehat{ZBt} = \widehat{ABZ'} = \gamma$$

$$\widehat{yBt} = \widehat{ZBt} - \widehat{ZBy} = \gamma - \beta\ \text{(with } \beta \text{ positive)}$$

$$\widehat{OBA} = \gamma - \beta$$

Now, $\widehat{OBZ} = \widehat{PNA} + \widehat{ABZ'} = \gamma + -\beta$ is the complement of $\widehat{OBH}$. Thus we have:

$$h/b = cotg\ (2\gamma - \beta)$$

In the case as described with reference to FIGS. 1, 3 and 5 in which the oriented angle $\beta$ has a negative sign, we have (see FIG. 8):

$$h/b = tg\ \widehat{OBH}$$

$$\widehat{OBA} = \widehat{yBT}$$

$$\widehat{zBT} = \gamma$$

$$\widehat{yBt} = \gamma + \widehat{zBy}$$

However, as $zBy = \beta$ and $\beta$ is negative, we must write in order to obtain the sum $\gamma + \widehat{zBy}$ $$\widehat{yBt} = \gamma - \beta$$

In the final analysis, this amounts to the same equation as in the other case:

$$h/b = cotg\ (2\gamma - \beta)$$

The predetermination in accordance with the invention of the value of the angle $\beta$ is then done in two ways according to whether the sign of $\beta$ is chosen positive or negative.

Figure 9:
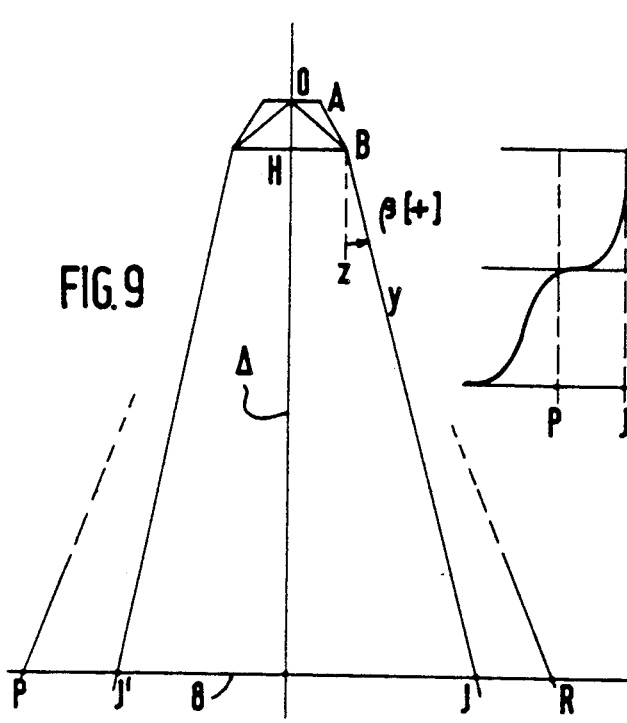
FIGS. 9 and 10 show the distribution of the beams and the luminance diagrams corresponding to a first dimensional arrangement.

If $\beta$ is of positive sign (see FIG. 9 one selects a value as close as possible to half of that of the so-called aperture angle $\alpha$. Thus the area of increased brightness between J' and J in the mean plane of utilisation 8 tends to merge with the main illuminated area. The illumination in this area, proportional to the cube of the cosine of the angle of incidence of the rays, decreases increasingly rapidly between the centre of the illuminated field and the points J' and J, with the result that if these angles of incidence become relatively great, this factor of the cosine cubed permits effective progressive attenuation of the additional brightness. This does not happen when the area J'J is narrow. The higher the value of the so-called aperture angle $\alpha$, the more difficult is it to make the value of $\beta$ tend towards that of $\beta$, since this can bring about in extreme cases an excessive subsequent increase in the values of b and h. It is then necessary to opt for a compromise. Fortunately, experience shows that a value of 0.70 metres for J'J on a plane of utilisation situated at, for example, 2 metres from the projector procures acceptable homogeneity under normal conditions of utilisation. This estimate corresponds to a value of only 10 degrees approximately for the angle $\beta$. There is therefore a margin for manoeuvre permitting remarkable miniaturisation of the device.

Figure 10:
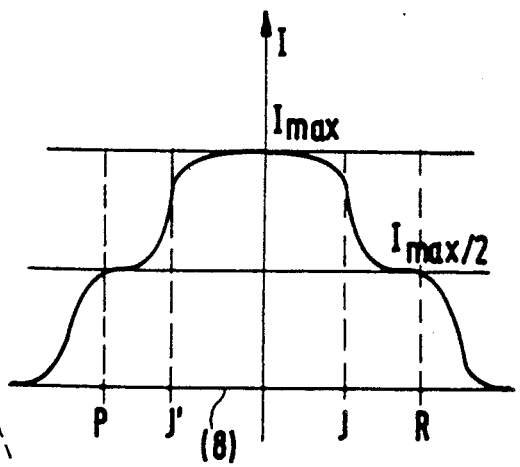

Instead of the distribution of luminance on the mean plane of utilisation 8 as shown in FIG. 6 in a similar, non-optimised case, there are obtained with the present optimisation distributions of the general form shown in the diagram of FIG. 10.

If $\beta$ is of negative sign (see FIG. 11) it is assigned a value such that the extreme rays reflected at the edges of the larger section of the conoid or pyramidoid, such as By and the symmetrical ray relative to the axis Δ, join at the intersection H' of the axis and the mean plane of utilisation 8. As a result, the points D and D' as defined in connection with FIG. 3 merge at H' and the area 9 of reduced brightness disappears.

If d designates the distance HH' from the larger section of the conoid or pyramidoid to the mean plane of utilisation 8, the relational equation determining the angle $\beta$ as a function of d and the distance b=HB is already defined:

$$tg\beta = b/d$$

Instead of the distribution of luminance on the mean plane of utilisation 8 as shown in FIG. 5 in a similar, non-optimised case, there are obtained with the present optimisation distributions of the general form shown by the diagram of FIG. 12.

These new optimisations, especially in the case where the oriented angle $\beta$ has a positive sign, lead to the adoption for the average half-angle $\gamma$ of the facing reflective surfaces of the conoid or pyramidal mirror values slightly greater than those which were optimised in the applicant's earlier patent Nos. FR-A.2.224.769 and FR-A.2.224.770. Expressing the value of $\gamma$ as a function of the value of $\beta$, the so-called aperture angle, the earlier patents establish the relationship:

$$\gamma \approx 0.48 \, \alpha$$

According to the present invention, the new optimal relationship is:

$$\gamma \approx 0.52 \, \alpha$$

Another characteristic of the invention consists in the fact that, in the case where the angle $\beta$ has a positive sign, each of the facing reflective surfaces of the conoid or pyramidal mirror, as shown at AB in FIGS. 13 and 14, advantageously features a curvature with the convex side facing towards the axis of symmetry Δ, either such curvature only in the vicinity of the smaller section and the larger section (FIG. 13), or this curvature extending to the vicinity of the middle of the profile AB of the reflective surface, its curvature progressively decreasing from the ends A and B towards the vicinity of this middle (FIG. 14).

The result in both cases is that the extreme reflected rays By' and Ax' have respective inclinations δ' and Δ' relative to the axis Δ greater than the inclinations δ and $\beta$ of the rays By and Ax (shown in dashed line) reflected at a surface whose profile AB were strictly rectilinear.

The consequence, visible in FIG. 15, is that on the mean plane of utilisation 8 the points j and j' which delimit the central area of increased brightness move closer to the respective points P and R delimiting the so-called aperture angle α. This is particularly advantageous when the value of α is high and it is difficult to make the value of $\beta$ tend towards that of α/2.

Likewise, the points g and g' corresponding to the rays inclined at angle δ' to the axis Δ move away from the central point H' on the mean illuminated plane 8. This results in a widening of the illuminated field incurring an increase in α. This result may be beneficial, especially when the so-called aperture angle α required is great and therefore difficult to achieve because of this. On the other hand, if it is not wished to increase the angle δ but only to increase the angle $\beta$, the reflective surface may be curved only in the vicinity of the point B or over only that half of the surface on the side of the edge B of the larger section of the conoid or pyramidal mirror.

When it is required to limit the curvature to the immediate vicinity of the point B and/or the point A, this curvature may be obtained on guillotining the reflective surface, exploiting what is often considered a disadvantage.

The distribution of luminance obtained on the plane 8 has the general form of the curve in full line in FIG. 16. The diagram of FIG. 10, corresponding to non-curved surfaces, is reproduced in dashed line in FIG. 16. It is seen that homogeneity is substantially improved with the curvatures, especially at the edges like B.

Also, it may be advantageous in certain cases to extend the facing reflective surfaces of the conoid or pyramidoid towards the rear, short of the plane of the emissive body of the source perpendicular to the mean axis Δ. FIG. 17 shows an embodiment of this kind. The profile BA of the reflective surface 6 may be extended as far as a point A' such that the angle of incidence of the ray OA' is equal to $\pi/2$. Beyond this, the rays would be reflected towards the rear and not in the direction towards the mean plane of utilisation.

This embodiment has two kinds of advantage. Firstly, the proportion of the flux emitted by the source and captured by the conoid or pyramidal mirror is greater and, conjointly, the flux emitted towards the rear of the device and that has to be recovered in order to direct it towards the front is reduced. The losses inherent in such recovery are often greater than those inherent in reflections at the reflective surfaces of the conoid or pyramidal mirror. Secondly, the supplementary flux captured in this way between the ray OA and the ray OA' and then reflected along the rays Ax and A'u after second reflection of OA', then A'A" at A", extending within an angle ξ, contributes to homogenising the resultant sum of the other fluxes already described to the extent that there is chosen, between A and A', the position of the end point of the extension of the profile BA which permits, in each case, the most effective action of the flux contained within the the angle ξ, given the value of α and that of $\beta$. For example, the end point of the extension may be at M, such that the ray OM, reflected a first time along MM' and then a second time along M'u', the flux captured between A and M by the extended reflective surface 6 is then, after two reflections, directed towards the plane of utilisation within an angle , finally reaching this plane 8 (FIG. 9) in a marginal region of the area J'J of increased brightness or even beyond, towards the points P and R corresponding to the so-called aperture angle α. Such predetermination of the point M may make it possible to reinforce regions adjacent the points J' and J and to further reduce luminance irregularities.

In all of the foregoing description the source 3 having the point or quasi-point emissive body 4 is assumed to feature in the meridian planes considered a Lambertian distribution of intensity. FIG. 18 shows the polar diagram of such a distribution. It is a circle. The origin of the vectors representing the intensity being the point O, the maximum intensity Imax is represented by the vector $\overrightarrow{Oe}$ passing through the centre of the circle.

The so-called aperture angle α' of the source is contained between the vectors $\overrightarrow{Of}$ and $\overrightarrow{Of'}$ the lengths of which are equal to half that of the vector $\overrightarrow{Oe}$. As a result the angle $e\widehat{O}f$, the cosine of which is ½, has a value of 60 degrees. The so-called aperture angle α has a value of 120 degrees in the half-plane with Oe as its axis.

The same does not apply to sources such as the short arcs in an atmosphere of xenon or metal halogenides which are the commonest form of point or quasi-point emissive body sources. An arc of this kind is produced (see FIG. 19) between electrodes 12 and 13 disposed in a cavity 14 whose opaque walls 15 and 16 delimit the radiation emitted. The polar diagram 17 of the distribution of intensities typically has the shape indicated in FIG. 19. The maximum intensity Imax is represented by the vector $\overrightarrow{Ol}$. The so-called aperture angle α is delimited by the vectors $\overrightarrow{Om}$ and $\overrightarrow{Om'}$. In the example shown, α has a value of 65 degrees in the meridian section considered.

For the usual so-called "wide beam" projector devices, the so-called aperture angle α required is of the order of 55 to 75 degrees, approximately. It is then advantageous, in a case such as this, to render appropriate to the so-called aperture angle α" of the source in this meridian section the so-called aperture angle α of the wide beam projector device by setting its value at 65 degrees. It is then possible to eliminate the two facing reflective surfaces of the conoid or pyramidal mirror which would be perpendicular to this meridian section. The distribution of the flux emitted by a source of this kind remaining generally Lambertian in the meridian section perpendicular to the latter, the device reduces to two facing reflective surfaces 21 and 22 in the arrangement shown in FIG. 20.

The source 3 of which the point or quasi-point emissive body 4 is a short arc, in an atmosphere of metal halogens, for example, has a longitudinal axis 18 passing through the emissive body 4. The source 3 has two planes of symmetry 19 and 20 passing through the emissive body 4 and perpendicular to each other. In the plane 19 containing the axis 18 of the source the distribution of intensity is substantially as shown in FIG. 19. In the plane (not shown) parallel to the plane 20 and passing through the emissive body 4, the Lambertian distribution of intensity is substantially that shown in FIG. 18. The device in accordance with the invention consists here in a pyramidal mirror reduced to two plane reflective surfaces 21 and 22 whose profiles 23 and 24, in the plane of symmetry parallel to the plane 20 and passing through the emissive body 4, have the dimensional characteristics previously described specific to the invention.

FIG. 21 shows an improvement to the device which has just been described. Two plane reflective faces perpendicular to the plane 19 (of FIG. 20) having in this plane 19 rectilinear profiles 25 and 26 dispersed so as to capture the fluxes which are emitted towards the front by the source of radiation and which are contained between the extreme rays 27 and 28 of the total flux and the rays 29 and 30 corresponding to the so-called aperture angle α" specific to the source. These fluxes are those contained between the rays Or and Or', on the one hand, and Om and Om' on the other hand, as shown in FIG. 19, within solid angles whose cross-section in the meridian plane 19 are the angles $\widehat{rom}$ and $\widehat{rom'}$. They do not contribute to illuminating the mean plane of utilisation in the region that is generally considered the most interesting, corresponding to the so-called aperture angle α. It is therefore advantageous in many cases to capture these fluxes and to reflect them in an angle π, preferably directing them towards areas of reduced brightness or to areas of transition between areas of different luminance.

It should be noted that the reflective surfaces of profiles 25 and 26 are of a totally different design to those of the facing reflective surfaces of the conoid or pyramidal mirrors which do not have the function which has just been described. The combination of the reflective surfaces of profiles 21 and 22 and the reflective surfaces of profiles 25 and 26 thus does not constitute a pyramidal mirror of the type described hereinabove.

The radiation projector optical device in accordance with the invention comprises a forward part, towards the plane of utilisation, like the conoid or pyramidal mirrors and their improvements herein described, and/or comprises at least a fraction of its reflective rear part featuring at least a meridian section of circular arc shape.

FIG. 22 shows on a meridian plane cross-section the optical schematic of a fraction of the reflective rear part of a projector device in accordance with the invention comprising a source 3 of radiation the emissive body 4 of which is of the point or quasi-point type, and a fraction 31 of rear part whose section is a circular arc, its centre 32 being situated forward of the emissive body 4 on the axis Δ of the projector device so that the reflected radiation has a point of convergence 33 situated forward of the outermost part of the source 3. The section of the mirror 31 (spherical or cylindrical) being circular and therefore belonging to the family of aplanar optics, the reflected flux is much more homogeneous than are the fluxes reflected by parabolic or elliptical mirrors belonging to the family of stigmatic optics only. This is what enables this fraction 31 of the device to fulfill its main role which is to reduce the contrast between the usual areas of increased and reduced brightness by superposing on them a substantially homogeneous flux.

Also, this substantially homogeneous flux extends from the point of convergence 33 within an angle ζ such that in any combination in accordance with the invention of this fraction 31 of the device with other optical elements, the flux finally obtained is distributed within a so-called aperture angle α having a predetermined value in each case.

FIG. 23 is a schematic representation of a device in accordance with the invention where a fraction of the rear part such as 31 as hereinabove described is combined with a traditional reflector 34 of any known shape. The combination of the substantially homogeneous flux from reflection on the fraction 31 reduces, as already stated, the contrast between the areas of increased and reduced brightness inherent to the reflector 34 and so renders the flux finally obtained less in homogeneous. Also, the values of the angle ζ and of the so-called aperture angle σ specific to the reflector 34 are assigned so as to produce a resultant flux in which the so-called aperture angle has a predetermined value α for the device as a whole. This may be achieved either by choosing σ less than α and ζ greater than α, or by choosing σ greater than α and ζ less than α, so that the one compensates the other in both cases.

The combination of this reflecting rear part fraction in accordance with the invention, such as 31, with any form of reflector constitutes a very simple embodiment of the invention.

The combination with a conoid or pyramidal mirror optimised in accordance with the invention such as those previously described constitutes a more sophisticated embodiment: a conoid or pyramidal mirror of this kind being of itself able, as has already been seen, of conferring on the projected radiation great homogeneity in a determined so-called aperture angle α.

In all cases where the reflective rear part fraction in accordance with the invention is employed, this fraction such as 31 may advantageously, as seen in FIG. 24, be incorporated into the source 3 itself. A source 3 of this kind with quasi-point emissive body 4, with a short arc in a metal halogenide atmosphere, for example, generally comprises a quartz "burner" 35 and an external envelope 36 also of quartz. The reflective fraction 31 may, as shown in FIG. 24, constitute part of the outer envelope 36, the profile of which is then a circular arc with centre 32. The fraction 31 receives a reflective treatment. It may also constitute a part (not shown) of the envelope 37 of the "burner" 35 itself. It may also consist of a mirror with a profile such as 31 incorporated into the source 3.

FIG. 25 shows in a meridian section in which the distribution of radiation intensities emitted by the source is Lambertian, a device in accordance with the invention comprising a source 3 of radiation with point or quasi-point emissive body 4, a conoid or pyramidal mirror 38 whose profiles 39 and 40 in the meridian section (plane of the figure) passing through the axis of symmetry Δ are dimensioned in accordance with the invention, a rear mirror fraction whose profile 41 has the shape of a circular arc centred at the point 42 on the axis Δ so that the flux captured by this mirror converges after reflection at a point 43 on the axis Δ, forward of the outermost part 37 of the source 3. Two reflective surfaces with circular arc profiles 44 and 45 centred on the emissive body 4 adjoin the profile fraction 41 and are disposed angularly one on each side of this fraction. These two reflective surfaces may be contiguous with the central fraction, as in the example shown in the drawing, or may not be contiguous, in which case their radius of curvature is smaller or greater than in the embodiment shown.

These two reflective surfaces capture the flux emitted by the source towards the rear which are not captured by the central profile fraction 41. They reflect towards the emissive body 4 these fluxes which, passing through the plasma of the short arc (generally constituting this emissive body) then behave like rays emitted directly towards the facing reflective surfaces 39 and 40 of the conoid or pyramidal mirror 38. The fact that these fluxes pass again through the plasma of the emissive body does not have any disadvantages as is proven by the practice of image ovens where half (a proportion much greater than in the present case) of the flux is returned to the arc by a hemispherical mirror. What must be avoided is any focussing of the radiation at a point on the quartz envelope of the burner and the lamp.

As already seen in connection with an embodiment of the invention described with reference to FIG. 17, the facing reflective surfaces of the conoid or pyramidal mirror are extended towards the rear, short of the plane of the emissive body of the source perpendicular to the mean axis Δ. It is in this case possible to reduce the rear reflecting surface profiles 44 and 45 (FIG. 25) of the parts where they no longer receive radiation from the source because of said extension. They may even be eliminated, if required, by increasing the value of the angle ζ of the central fraction 41.

It is therefore possible to replace these reflective surfaces the profiles 44 and 45 of which are circular with reflective surfaces (not shown) whose profiles are rectilinear. Such surfaces would reflect the radiation from the source towards the plane of utilisation, through the smaller section of the conoid or pyramidal mirror 38 and/or outside this small section. It would thus be possible, avoiding any focussing, either to reinforce the flux projected in a relatively wide angle or to direct the flux reflected by such rectilinear profile surfaces towards areas of reduced brightness or towards areas of transition between areas of differing luminance.

After converging at the point 43, the flux reflected by the central profile fraction 41 is substantially homogeneously distributed within an angle ζ. The value of the so-called aperture angle α of the device as a whole being predetermined, it is necessary to adjust the value of the so-called aperture angle specific to the single conoid or pyramidal mirror 38 and the angle ζ, allowing for the fact that the fluxes reflected by the conoid or pyramidal mirror 38 are reinforced by the fluxes reflected from the back by the reflective surface profiles 44 and 45. This leads to choosing for the so-called aperture angle of the conoid or pyramidal mirror an angle slightly less than α if ζ is much greater than α, or (more often than not) an angle greater than α if ζ is less than α.

FIG. 26 shows by way of example a device in accordance with the invention comprising a source 3 whose emissive body 4 is of the quasi-point type, a pyramidal mirror reduced to two reflective surfaces 21 and 22, as already described with reference to FIG. 20, a rear reflecting surface fraction 46 of cylindrical shape whose profile (not shown) in the meridian plane passing through the source, parallel to the plane 20, has the shape of a circular arc such as 41 (see FIG. 25), and two cylindrical reflective surfaces 47 and 48 having in the same meridian plane the profiles 44 and 45 described with reference to FIG. 25. In this example, the three rear mirrors are of cylindrical shape. The shape of the source 3, assumed here to be a short arc 4 in a metal halogenide atmosphere, is such that the recovery from behind of the flux emitted in the meridian plane 19 passing through the longitudinal axis 18 of the source concerns only a small fraction of the flux and that, in geometrical conditions under which they can operate, such recovery by means of cylindrical mirrors that are very easy to manufacture appears to be sufficient. The recovered flux passes again through the burner and through the part of the source which surrounds the latter.

It will be understood that these mirrors may also have circular profiles in planes parallel to the plane 19, the centre of these circular arcs being for the central fraction 46 the point 42 as specified in the description regarding FIG. 25 and the centre of the emissive body 4 for the mirrors 47 and 48.

The conoid or pyramidal mirrors as well as all the front and rear mirrors used in accordance with the invention may advantageously be fabricated from polished refined aluminium sheets.

Dimensions for devices in accordance with the invention are herein indicated by way of non-limiting example only.

The device which has just been described with reference to FIG. 26 may, for example, be dimensioned to obtain so-called aperture angles in the order of 60 degrees in the meridian plane 19 and in the meridian plane parallel to the plane 20. Given the action of the rear mirrors, the so-called aperture angle specific to the pyramidal elements constituted by the reflective surfaces 21 and 22 is chosen as approximately 63 degrees 30 minutes. As a result: γ≃0.52×63 degrees 30 minutes≃33 degrees. The value assigned to the angle β'is 12 degrees, so as to procure substantial miniaturisation in conjunction with highly acceptable homogeneity. The source in this example is a 70 watt metal halogen lamp with an outside diameter of 20 mm. The value taken for a (FIG. 1) is: 26/2 mm=13 mm.

Thus, applying the dimensional relationships in accordance with the invention:

$$\begin{cases} (b - a)/h = \text{tg } 33 \text{ degrees} \simeq 0.65 \\ h/b = \text{cotg}(66 - 12) \simeq 0.73 \end{cases}$$

Whence b=24.5 mm and h=18 mm.
The dimensions of the rear mirrors are as follows:
Radius of circular profile 41 (FIG. 25): 31 mm with the centre 42 at 9 mm in front of the source.
Radius of circular profiles 44 and 45: 25 mm centred on the arc of the source.
Width of mirrors 41, 44 and 45 parallel to axis 18 (FIG. 26): approximately 30 mm.
The device as a whole fits within a parallelepiped 5×5×4 cm.

If β is assigned values higher than 12 degrees, to bring this value closer to half the so-called aperture angle of the conoid or pyramidal mirror, in this instance around 30 degrees, the following dimensions are obtained, for example:
For β=20 degrees and γ=33 degrees:
a=13 mm, b=35 mm, h=34 mm
2a=26 mm, 2b=70 mm, h=34 mm
For β=25 degrees and γ=33 degrees:
a=13 mm, b=51 mm, h=58.5 mm
2a=26 mm, 2b=102 mm, h=58.5 mm
For β=30 degrees and γ=33 degrees:
a=13 mm, b=123 mm, h=142 mm Once the value of the angle β is in the order of 20 to 25 degrees, the homogeneity obtained is remarkable but it is seen that the miniaturisation is less extensive. These examples concern so-called "wide beam" illumination. Considering a "moderate" beam with α in the order of 40 degrees and gamma approximately 21 degrees, there is obtained:
For β=12 degrees:
a=13 mm, b=39 mm, h=67 mm
2a=26 mm, 2b=78 mm, h=67 mm
For β=16 degrees:
a=13 mm, b=122 mm, h=125 mm
2a=26 mm, 2b=244 mm, h=125 mm In the case of a "moderate" beam of this kind, there is not currently available a short arc source having a so-called aperture angle in the order of 40 degrees. The making of the so-called aperture angle of the source and of the device appropriate in accordance with the invention would then procure such a source. In other words, the device in accordance with the invention comprises, for example, a pyramidal mirror with four faces represented highly schematically in FIG. 27. A facing pair of these surfaces 21 and 22, parallel to the axis 18 of the source have dimensions such as have just been described in the latest example. The other facing surfaces 49 and 50 are in the meridian plane of symmetry passing through the axis 18 (19 in FIG. 26), rectilinear or substantially rectilinear profiles 51 and 52 the dimensions of which are determined in accordance with the invention. The basis of the calculation supplying the value of γ, the average angle of these profiles to the axis of symmetry Δ (see FIG. 28), is different to that for the previous dimensions. In this meridian plane passing through the axis 18, the extreme rays such as 53 and 54 emitted by the arc 4 and entering via the edges of the smaller section of the pyramidal mirror are at an angle θ to the axis Δ the value of which is generally around 55 degrees, instead of in the meridian plane perpendicular to the axis 18, the angle analogous to θ (see FIG. 1, angle between OA and Δ) would have the value π/2. The applicant's earlier patent Nos. FR-A-2.224.769 and FR-A-2.224.770 give dimensional relationships which may be used to set the value of γ in this case. Once this value of γ has been fixed, the dimensions are assigned as previously described.

All dimensions as previously described by way of example result from the family of devices in accordance with the invention for which the oriented angle β is positive. Devices for which the oriented angle β is negative differ in that this angle β is fixed from the outset by the equation tgβ=b/d and the value of b must be fixed first, rather than that of a. The initial value of b may then be modified by successive approximations to obtain a required value of a. To give an example, in the case, where the so-called aperture angle α of the device is in the order of 60 degrees, the applicant's earlier patent Nos. FR-A-2.224.669 and FR-A-2.224.770 prescribe for γ a value in the order of 0.48×60 degrees ≃29 degrees.

For b in the order of 25 mm with a mean plane of utilisation situated at 2 metres, we have:

tgβ=0.0125

β=0.716 degrees

With γ=29 degrees, the following dimensions result:
b=25 mm, a=13 mm, h=21.65 mm
2b=50 mm, 2a=26 mm, h=21.65 mm In accordance with another characteristic of the invention (see FIG. 29), another conoid or pyramidal mirror is added to the conoid or pyramid mirror 38 as described with reference to FIG. 25. It is seen in FIG. 29 that there are areas in which there are no rays emitted by the source within the so-called aperture angle α of the conoid or pyramidal mirror 38, or any rays reflected from the facing reflective surfaces of profiles 39 and 40, or any rays reflected from the circular profile rear reflecting surfaces 41, 44 and 45. Such areas free of any such radiation are delimited in the plane of the figure by the ray 55 delimiting the so-called aperture angle α, by the ray 56 tangential to the edge of the larger section of the conoid or pyramidal mirror 38, and by the ray 57 reflected by the profile 39 at the edge of the smaller section, on one side, and by the rays 58, 59 and 60 symmetrical to the rays 55, 56 and 57 relative to the axis Δ on the other side. These areas are shown white in the figure where all other areas, including the space occupied by the source 3, are shown shaded.

In these areas free of all such radiation, there are disposed reflective surfaces having profiles such as 61 and 62 in the plane of the figure. These profiles capture the radiation emitted by the source and reflect it within angles ψ and ψ' towards the plane of utilisation. The profiles 61 and 62 are inclined relative to the axis Δ such that the fluxes ψ and ψ' reach the mean plane 8 of utilisation (see FIGS. 3 and 4) in areas featuring reduced brightness such as the area DD' in FIG. 3 or a sudden reduction in luminance as in the areas RG' and J'P in FIG. 4. The homogeneity of the luminance in the mean plane 8 of utilisation is further improved in this way. The reflective surface whose profiles are shown at 61 and 62 may advantageously consist of a section of cone or a section of pyramid of revolution in polished refined aluminium. In the case of a pyramidoid as described with reference to FIG. 20, the two faces of this section of cone perpendicular to the plane 19 would then act as the reflective surfaces 25 and 26 described with reference to FIG. 21.

Another embodiment of the invention corresponds to a projection of the flux of radiation in the direction towards the longitudinal axis 18 of the source 3 (see FIG. 30). The plane of the figure is the plane 19 in FIG. 20. In this plane the flux with non-Lambertian distribution emitted by the emissive body 4 is contained within a solid angle 63. In the plane perpendicular to the plane of the figure passing through the emissive body the flux emitted is Lambertian. All of the flux emitted is captured by an elliptical mirror 64 of revolution about the axis 18 of which one focus F1 coincides with the emissive body 4. There is a conoid or pyramidal mirror 65 having for its mean axis the axis 18 and whose smaller section 62 has its centre coincident with the second focus F2 of the elliptical mirror 64. This conoid or this pyramidoid 65 captures the radiation with a maximum angle of incidence $\theta$ and its dimensions are chosen in accordance with the described characteristics of the present invention.

At present, most point or quasi-point source emissive bodies, which are short arc lamps in a metal halogenide atmosphere, must be used in a position near horizontal and must not be used vertically. This factor at present limits the use of the embodiment which has just been described to radiation projectors producing beams whose axis must be only slightly inclined to the horizontal. This may be the case with certain lighting projectors and is usually the case with cinema film projectors.

Finally, one specific embodiment of the invention consists in making the facing reflective surfaces of the conoid or pyramidal mirror mobile in translation perpendicular to the mean axis of the device, in such a way as to vary the distance between them while maintaining constant the value of the half-angle $\gamma$ at the summit of the conoid or pyramidal mirror.

This embodiment is not shown since it consists of a simple mechanical assembly which can be achieved by all manner of known means and thus lies within the competence of those skilled in the art.

What is claimed is:

1. A method of illuminating a given mean plane of utilisation located at a distance d from a larger section of the reflective surfaces of an optical radiation projector device of the type comprising a source of radiation and adapted to produce on said given plane of utilization an illumination having a so-called aperture angle of predetermined value, said device including a reflector having an axis of symmetry passing through said source and including a front part on one side of said source that is closet to said plane of utilization and a rear part on the opposite side of said source, said device including means for making the radiation illuminating the plane of utilization as homogeneous as possible within said aperture angle, said method comprising the steps of:

in said reflector, disposing two reflective surfaces so as to face each other with dimensions and positions in space for which the geometric characteristics of the shapes in sections relative to a plane of symmetry substantially satisfy the following equations:

$(b-a)/h = tg\gamma$ $h/b = cotg(2\gamma - \beta)$ where
$\beta$ is the mean half-angle of an angle extending between two intersecting planes in which said reflecting surfaces extend, the value of which is on the order of 0.52 times the aperture angle,
a is the perpendicular distance between the axis of symmetry and the point of closest approach of each of said reflective surfaces with respect thereto,
b is the perpendicular distance between the axis of symmetry to each reflective surface corresponding to the largest distance between these points,
h is the distance on the axis of symmetry between the smaller section and the larger section of the reflective surfaces,
$\beta$ is the trigonometrical angle measured in an anti-clockwise direction and defined by a line parallel to said axis of symmetry and originating at a point situated at the edge of each said reflective surface at the large end thereof and constituting a reflection of a vector corresponding to radiation from said source at said point and forming an angle the value of which is determined so as to be as near as possible to one half that of the said aperture angle of said device, said value being determined by the equation:

$tg\beta = b/d$ in which d is the distance between the larger section of said reflective surfaces and said mean plane of utilization.

2. Method according to claim 1, characterised in that the device being of the type comprising both the front and rear arrangements, the rear part comprises two reflective surfaces adjoining the fraction, contiguous therewith, disposed angularly one on each side and having meridian sections of circular arc shape centered on the source of radiation.

* * * * *